(12) United States Patent
Pathak et al.

(10) Patent No.: US 10,984,119 B2
(45) Date of Patent: Apr. 20, 2021

(54) SIMPLIFYING DATA PROTECTION IN CDS BASED ACCESS

(71) Applicant: SAP SE, Walldorf (DE)

(72) Inventors: Tapasweni Pathak, Delhi (IN); Venkat Bhargav A S, Bangalore (IN)

(73) Assignee: SAP SE, Walldorf (DE)

(*) Notice: Subject to any disclaimer, the term of this patent is extended or adjusted under 35 U.S.C. 154(b) by 490 days.

(21) Appl. No.: 15/888,405

(22) Filed: Feb. 5, 2018

(65) Prior Publication Data

US 2019/0243981 A1 Aug. 8, 2019

(51) Int. Cl.
G06F 21/62 (2013.01)
G06F 16/22 (2019.01)
G06F 16/2455 (2019.01)

(52) U.S. Cl.
CPC .......... G06F 21/62 (2013.01); G06F 16/2282 (2019.01); G06F 16/2455 (2019.01)

(58) Field of Classification Search
CPC .. G06F 21/62; G06F 16/2282; G06F 16/2455; G06F 21/629
See application file for complete search history.

(56) References Cited

U.S. PATENT DOCUMENTS

| | | | | |
|---|---|---|---|---|
| 6,879,408 B1* | 4/2005 | Hori | ...................... | G06F 3/1204 358/1.11 |
| 10,114,861 B2* | 10/2018 | Poon | ................... | G06F 16/2452 |
| 2004/0186826 A1* | 9/2004 | Choi | .................. | G06F 16/24522 |
| 2006/0248599 A1* | 11/2006 | Sack | ................... | G06F 21/6227 726/27 |
| 2012/0159567 A1* | 6/2012 | Toy | ....................... | H04L 63/104 726/1 |
| 2012/0330925 A1* | 12/2012 | Ramamurthy | .... | G06F 16/24534 707/718 |
| 2015/0074136 A1* | 3/2015 | Falter | .................... | G06F 16/288 707/760 |
| 2015/0142852 A1* | 5/2015 | Lippert | ............... | G06F 21/6227 707/785 |

(Continued)

Primary Examiner — Farid Homayounmehr
Assistant Examiner — Sanchit K Sarker
(74) Attorney, Agent, or Firm — Buckley, Maschoff & Talwalkar LLC (57) ABSTRACT

A method and system are provided including a data protection module; a display; and a data protection processor in communication with the data protection module and operative to execute processor-executable process steps to cause the system to: present a user interface on a display, the user interface including one or more application packages; receive selection of one of the one or more application packages; present on the display a user-entry field to receive an end-user-role associated with an administrative function, wherein the end-user-role is authorized to access at least one CDS view; receive an input in the user-entry field, wherein the input is one of the end-user-role and a request for assistance; determine whether the selected application package includes at least one core data service (CDS) view; determine whether a data control language (DCL) layer is provided for each included CDS view; and automatically generate the DCL layer for each included CDS view if the DCL layer is not provided for the included CDS view. Numerous other aspects are provided.

17 Claims, 11 Drawing Sheets

(56) References Cited

U.S. PATENT DOCUMENTS

| | | | |
|---|---|---|---|
| 2015/0220553 A1* | 8/2015 | Poon | G06F 16/2452 |
| | | | 707/722 |
| 2016/0364445 A1* | 12/2016 | Golec | G06Q 10/10 |
| 2017/0300265 A1* | 10/2017 | Gopi | G06F 3/0617 |
| 2017/0300672 A1* | 10/2017 | Kauerauf | G06F 8/38 |
| 2018/0330113 A1* | 11/2018 | McGrath | G06F 16/9535 |
| 2019/0243981 A1* | 8/2019 | Pathak | G06F 21/62 |

* cited by examiner

| FIELD | AUTH_OBJ FLAG |
|---|---|
| address | Y |
| address | Y |
| BLDG | N |

TABLE 1

FIG. 9A

| FIELD | AUTH_OBJ SET |
|---|---|
| address | X_Y_ZAA |
| address | X_Y_ZAB |
| address | X_Y_ZAC |
| EMP ID | X_Y_ZBA |
| EMP ID | X_Y_ZBB |

TABLE 2

FIG. 9B

| FIELD | RELEVANT AUTH_OBJ FROM "MANAGER" ROLE |
|---|---|
| address | X_Y_ZAA |
| EMP ID | X_Y_ZBB |

TABLE 3

FIG. 9C

| FIELD | AUTH_OBJ |
|---|---|
| address | X_Y_ZAA |
| address | X_Y_ZAB |
| address | X_Y_ZAC |
| EMP ID | X_Y_ZBA |
| EMP ID | X_Y_ZBB |

TABLE 4

FIG. 9D

```
@EndUserText.label: 'authorization for Access Control(DCL)view name '
@MappingRole: true
define role DDL View name           (
   grant select on (  DDL View name
      where (       Field1
                                    ) =
      aspect pfog_auth (
               Authorization object of Field1
                                    )
      and (         Field2                    ) ?=
      aspect pfog_auth (
               Authorization object of Field2
                                    ) :

)
```

206 (annotation pointing to the `where` clause)

FIG. 10

| FIELD | AUTH_OBJ FLAG |
|---|---|
| Acc. holder. address | Y |
| Acc. number | Y |
| Acc. holder. mobile | Y |
| Acc. holder. age | Y |
| bldg | N |

TABLE 1

FIG. 11A

| FIELD | AUTH_OBJ GET |
|---|---|
| Acc. holder. address | Address_Bank |
| Acc. holder. address | Address_Company |
| Acc. holder. address | Address_Library |
| Acc. number | AccNum_Bank |
| Acc. number | AccNum_Company |
| Acc. number | AccNum_Library |
| Acc. holder. mobile | Acchold_mobile_Bank |
| Acc. holder. mobile | Acchold_mobile_Company |
| Acc. holder. mobile | Acchold_mobile_Library |
| Acc. holder. age | Acchold_general_age |

TABLE 2

FIG. 11B

| FIELD | RELEVANTAUTH_OBJ FROM "BANK" ROLE |
|---|---|
| Acc. holder. address | Address_Bank |
| Acc. number | AccNum_Bank |
| Acc. holder. mobile | Acchold_mobile_Bank |
| Acc. holder. DOB | Acchold_general_DOB |

TABLE 3

FIG. 11C

| FIELD | AUTH_OBJ |
|---|---|
| Acc. holder. address | Address_Bank |
| Acc. holder. address | Address_Company |
| Acc. holder. address | Address_Library |
| Acc. number | AccNum_Bank |
| Acc. number | AccNum_Company |
| Acc. number | AccNum_Library |
| Acc. holder. mobile | Acchold_mobile_Bank |
| Acc. holder. mobile | Acchold_mobile_Company |
| Acc. holder. mobile | Acchold_mobile_Library |

TABLE 4

SIMPLIFYING DATA PROTECTION IN CDS BASED ACCESS

BACKGROUND

Enterprises typically use software applications and application-related services in the execution of their businesses. The application may retrieve data from a database to display to an end user in an application view based on an end user query. For each application area, hundreds (e.g., 300 to 400) of views may be possible, depending on the executed end user query, which means there may be hundreds of different ways to access the data. Different end users may be authorized to access different aspects of the data based on their role in the enterprise. During application development, a developer may include information in the application which specifies data access restrictions. However, including restriction information for each possible view may be time-consuming, cumbersome, and may result in over- or under-authorization of data access.

Systems and methods are desired which support efficient and effective data protection.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

During execution of an organization's business, an end user may execute a query, and, in response, an application may retrieve and/or manipulate data stored in a database, and display the results to the end user in an application view. Different end users may be authorized to access different aspects of the data based on their role in the enterprise ("end-user-role").

Typically, prior to storing and accessing data in a cloud, each transaction is associated with an end-user-role and an authorization criteria, whereby the end-user-role is only able to access particular data based on the associated authorization criteria. However, with cloud technology, the restriction of access to the data is more challenging, as cloud technology makes use of data centers where end-users may access data for which they may not be authorized.

Embodiments may provide for the creation of a Data Control Language (DCL) view to be transmitted with each data definition language (DDL) view. The DCL view may include an authorization object to prevent the data view from being exposed to unauthorized end users. However, the conventional manual creation of a DCL view for every DDL view and the inclusion of every field of data in the view may be a tedious, time-consuming and error-prone process for an application developer. For example, the developer may at least one of: over-authorize access to the data (e.g., make it available to too many application user end-points), may under-authorize access to the data (e.g., make it available to not enough application user end-points), and may incorrectly associate authorization objects with data. As used herein, the term "DCL Layer" may refer to two or more DCL views together, created across all Data Definition Language (DDL) views (data-accessible format) in an application package. The DCL layer may be a protection layer on the DDL views in an application package. As used herein, the "DCL view" may be an entity over a single DDL view, which may have optimal authorization objects required to protect the data being exposed from the DDL view.

In one or more embodiments, when an application developer ("developer") creates an application package, the developer may select authorization objects to allow access to the different data fields based on the role of the end. These authorization objects may be applied across the multiple views for that end-user-role, instead of setting the authorization objects for each view. A DCL view may be automatically generated for each view based on that selection, for transmission with the view. In one or more embodiments, authorization objects for association with that view may be suggested, or may be originated by the developer.

Figure 1:
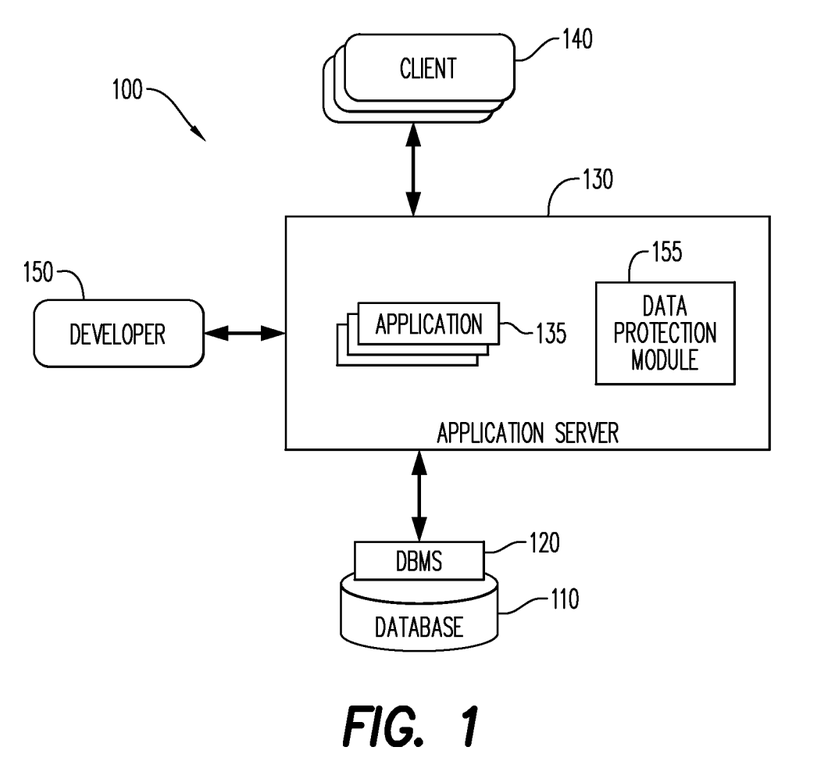
FIG. 1 is a block diagram of a system architecture according to some embodiments.

FIG. 1 is a block diagram of system architecture 100 according to some embodiments. Embodiments are not limited to architecture 100 or to a three-tier database architecture.

Architecture 100 includes database 110, database management system (DBMS) 120, application server 130, applications 135, clients 140, a developer 150, and a data protection module 155. Applications 135 may comprise server-side executable program code (e.g., compiled code, scripts, etc.) executing within application server 130 to receive queries from clients 140 and provide results to clients 140 based on data of database 110. An application developer 150 may access the application packages 135 executing within application server 130 and, via the data protection module 155, may create authorization access for the client 140 to query results as described herein. As used herein, the terms "application package" and "application" may be used interchangeably.

Figure 2:
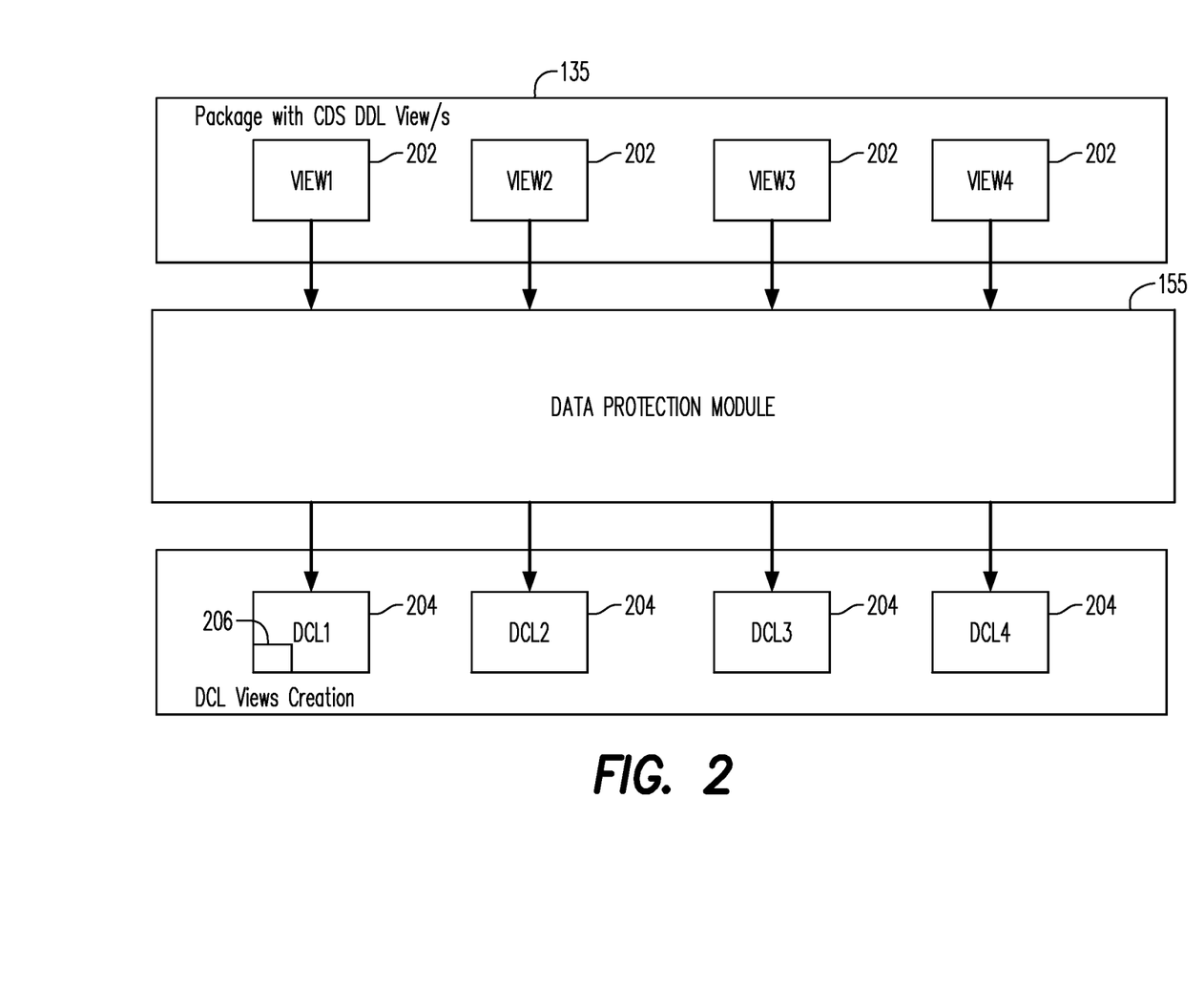
FIG. 2 is a block diagram of a system architecture according to some embodiments.
Figure 12:
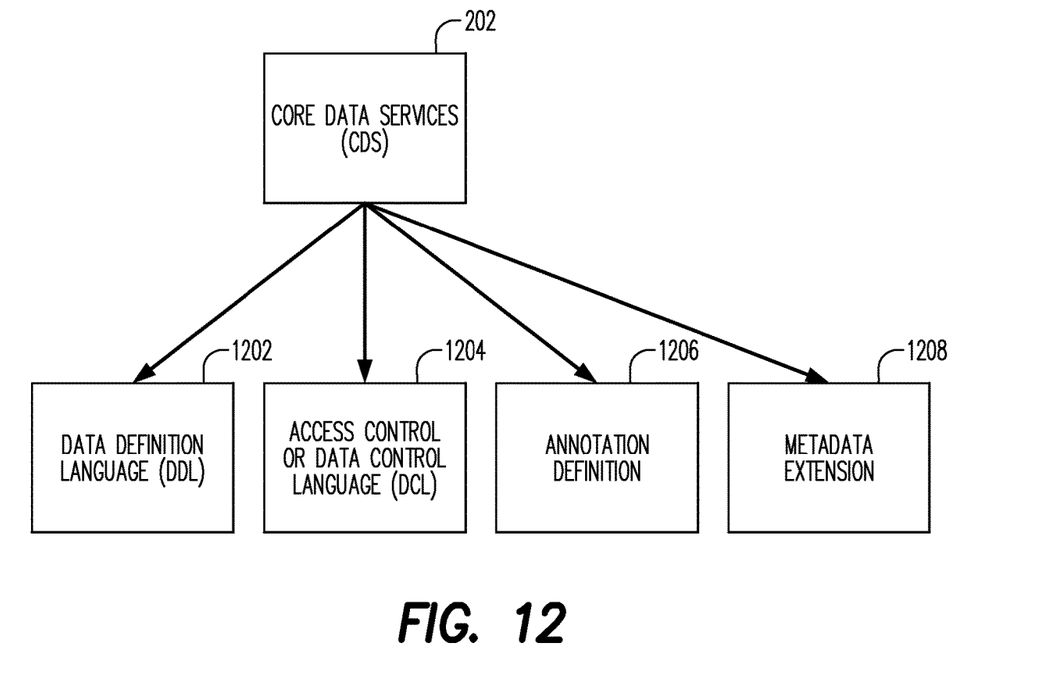
FIG. 12 is a block diagram according to some embodiments.

Execution of the application package 135 may result in the output of one of hundreds (e.g., typically 300-400) of possible views 202 (FIG. 2). A data model represents a framework of what relationships are in a database. Data models are the foundation of software development. The data models may provide a standardized method for defining and formatting database contents consistently across systems, enabling different applications to share the same data. A Data Definition Language "view" is a form in which data is accessed by the client 140 from tables storing all the information in a database. In one or more embodiments, the CDS DDL view 202 may be a Core Data Service ("CDS") view. As shown in FIG. 12, the CDS view 202 may include Data Definition Language (DDL) 1202, Access Control or Data Control Language (DCL) 1204, an annotation definition 1206, and a metadata extension 1208. The CDS view is a data modeling infrastructure for defining and consuming semantic and reusable data models on the database, rather than on an ABAP server, for example, regardless of the database system used. The data models may be expressed in Data Definition Language Source (DDLS) and may be defined as CDS views. The CDS views may be used in ABAP programs via Open SQL statements, or in any other suitable form, to enable access to the database. The CDS view may include Data Definition Language (DDL), Access In one or more embodiments, the CDS view 202 may be associated with a Data Control Language (DCL) view 204 to protect the data. In one or more embodiments, the DCL view 204 may include authorization language in the form of one or more authorization objects 206. The authorization objects 206 may restrict exposure of the data to users that meet one or more parameters of the authorization object 206. In one or more embodiments, the data protection module 155 may provide for the automatic restriction of access to the different views 202 via application of the authorization objects 206.

In one or more embodiments, the DCL view may be generated per the DDL view, such that the developer 150 is able to select authorization objects 206 for different fields based on the role of the client 140 in a single interface instead of opening each view 202 and setting the authorization objects 206 in each view 202, which the developer may not be aware of. In one or more embodiments, the selected authorization objects 206 may then be associated with the different views based on the link to the role name 608. It is noted that a benefit of this aspect is the efficiencies with which the DCL layers may be generated. For example, for an application package 135 with 300-400 views, for example, and some number of fields in each view, the developer 150 may only have to link the authorization objects to each role, and the link will be set across all of the views associated with this role. As a non-exhaustive and simplified example, if the package 135 has ten views, there may be five fields in all of the ten views, meaning there are fifty fields that may each have at least one authorization object associated with it. Conventionally, the developer would open each view and manually enter the authorization objects for each field for each role. Conventionally, there is no simple way to know about all of the authorization object(s) relevant for a field. Continuing with our example, conventionally the developer would have to associate/enter at least fifty authorization objects for each role. In contrast, in one or more embodiments, the developer 150 does not need to go into each view and instead may have a single user interface 700 (FIG. 7) whereby the developer may associate authorization objects with different fields for the views associated with the particular role. The inventors note that benefits of embodiments include efficiently creating authorization objects for multiple views via a single user interface, while avoiding human error in authorizing access (e.g., over-authorizing, under-authorizing, wrongly-authorizing).

A user who can access a DDL view may have access to all data returned in the DDL view. In one or more embodiments, as described further below, the DCL view 204 may be transmitted to the client 140 with the DDL view, such that security is delivered with the data. For example, a role of Business_Partner_Account may be associated with two authorization objects: autho_address and autho_accountinfo. The client 140 may be able to engage in a customer transaction, and may be assigned to the role of Business_Partner_Account. As such, when the DCL view 204 is developed for Business Partner DDL views, the two authorization objects may be linked to the views via the role of Business_Partner_Account. In this way, the client 140 assigned the role of Business_Partner_Account may access the business partner transaction DDL views based on the associated authorization objects 206, but not views where the authorization object is autho_address, for example.

In one or more embodiments, the data protection module 155 may determine whether an application component has a DDL view 202, and if so, whether the DCL layer 204 exists for the DDL view 202. If the DCL layer 204 does not exist, the data protection module 155 may create the DCL layer 204, as described further below.

Application server 130 provides any suitable interfaces through which clients 140 and developer 150 may communicate with applications 135 and the data protection module 155 executing on application server 130. For example, application server 130 and the data protection module 155 may each include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 135 executing on server 130, as well as the data protection module 155 may communicate with DBMS 120 using database management interfaces such as, but not limited to, Open Database Connectivity (ODBC) and Java Database Connectivity (JDBC) interfaces. These types of applications 135 and the data protection module 155 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from or closely integrated with DBMS 120. A closely-integrated application server 130 may enable execution of server applications 135 and the data protection module 155 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients and developers. In addition to exposing the data model, application server 130 may host system services such as a search service.

Database 110 may store data used by applications 135 and the data protection module 155. For example, database 110 may store user-role data, employee information (e.g., home address, e-mail address, personal information) and/or any other data for use in an organization.

Database 110 may comprise any query-responsive data source or sources that are or become known, including, but not limited to, a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in, and/or backed up to, fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Developer 150 and client 140 may comprise one or more individuals or devices executing program code of a software application for at least one of: executing applications; creating access limitations to data resulting from executed applications, and presenting user interfaces to allow interaction with application server 130. Presentation of a user interface as described herein may comprise any degree or type of rendering, depending on the type of user interface code generated by application server 130. As used herein, the terms "client" and "end-user" may be used interchangeably.

For example, the client 140 may execute a Web Browser to request and receive a Web page (e.g., in HTML format) from a website application 135 of application server 130 via HTTP, HTTPS, and/or WebSocket, and the Web page may be rendered and presented according to known protocols. The client 140 may also, or alternatively, present user interfaces by executing a standalone executable file (e.g., an .exe file) or code (e.g., a JAVA applet) within a virtual machine.

FIGS. 2-10 include a flow diagram of process 300 (FIG. 3) described with respect to a system architecture and an outward view of user interface 400 (FIG. 4), 600 (FIG. 6) and 700 (FIG. 7) according to some embodiments. Process 300 may be executed by application server 130 according to some embodiments, e.g., by execution of the data protection module 155, to provide for a developer to automatically restrict the access of a client to data in the system 100 based on the client role. In one or more embodiments, the application server 130 may be conditioned to perform the process 300, such that a processor 810 (FIG. 8) of the server 130 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 6:
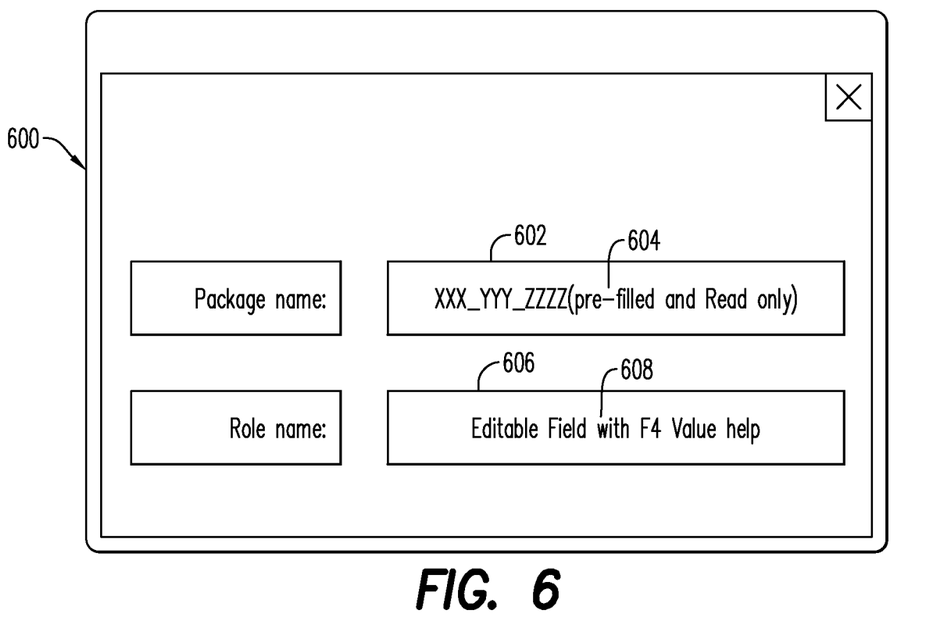
FIG. 6 is an outward view of a graphical interface according to some embodiments.
Figure 7:
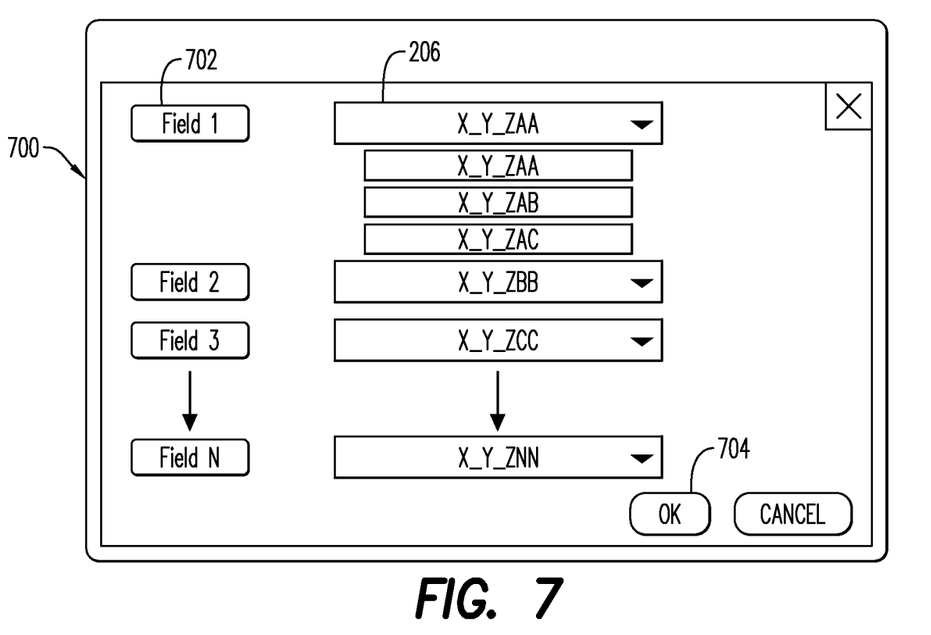
FIG. 7 is an outward view of a graphical interface according to some embodiments.

User interface 400/600/700 may be presented on any type of display apparatus (e.g., desktop monitor, smartphone display, tablet display) provided by any type of client device (e.g., desktop system, smartphone, tablet computer). The application which is executed to provide user interface 400 may comprise a Web Browser, a standalone application, or any other application. Embodiments are not limited to user interface 400 of FIG. 4.

As used herein, the terms "app" or "application" refer to a self-contained program or piece of software designed to fulfill a particular purpose.

Figure 4:
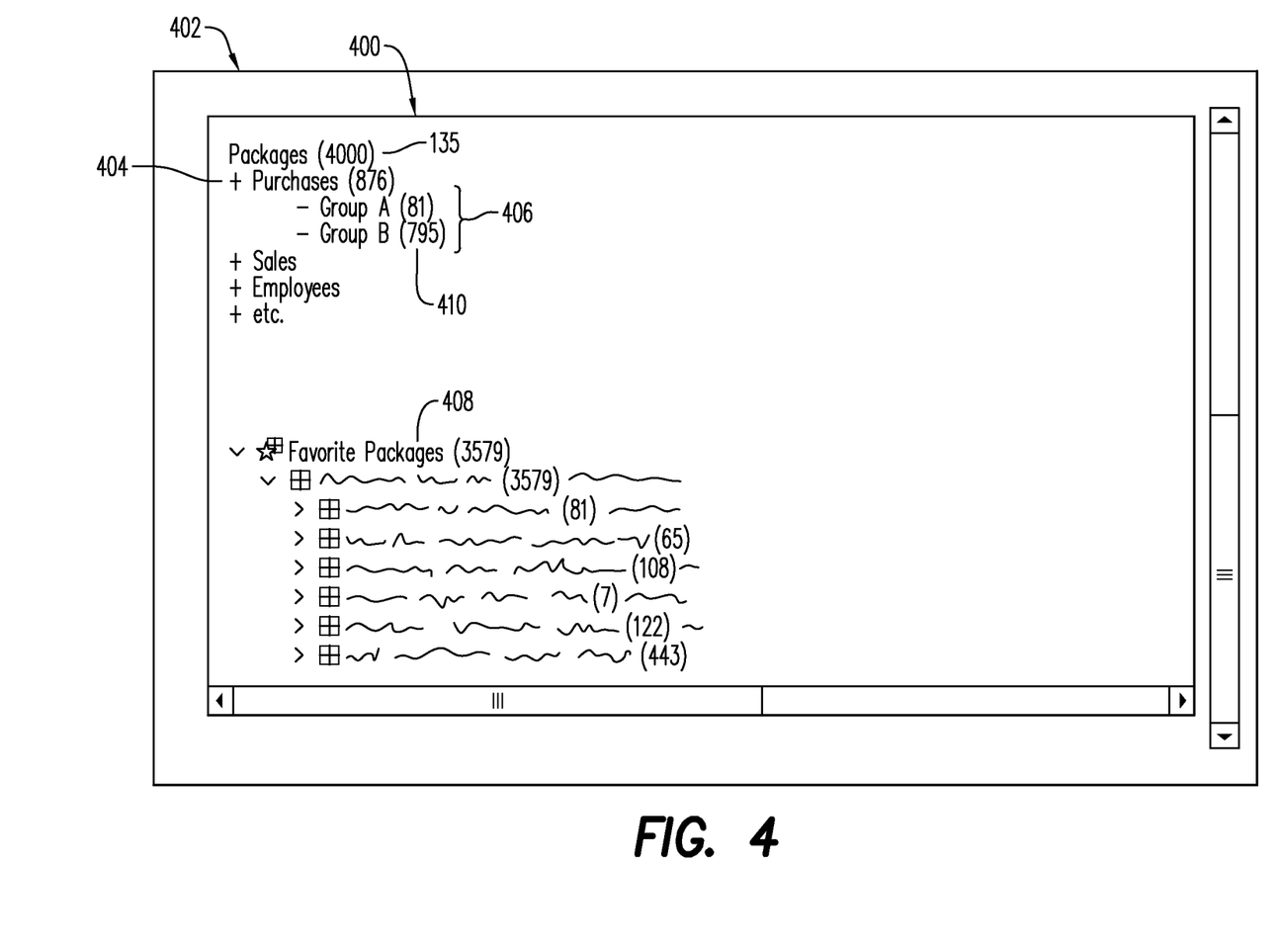
FIG. 4 is an outward view of a graphical interface according to some embodiments.

Prior to execution of the process 300, at least one application package 135 is provided on the application server 130. Initially at S310, the developer 150 may be presented with a user interface (UI) 400 (FIG. 4) on a display 402 (FIG. 4). The UI 400 may include a list of one or more selectable application packages 135. In one or more embodiments, the selectable application packages 135 may be categorized in a hierarchy, whereby a category 404 of application packages 135 (e.g., purchases, sales, employee information) may be selected and then a drop-down list 406 of selectable packages may be provided. In one or more embodiments, the UI 400 may include a section of favorite or frequently accessed application packages 408. In one or more embodiments, a view indicator 410 may indicate the number of views available for a particular package. For example, for the purchase category 404, the view indicator 410 for the group A application package 135 may indicate 81 available views 202, while the view indicator 410 for the group B application package 135 may indicate 795 views 202.

Figure 3:
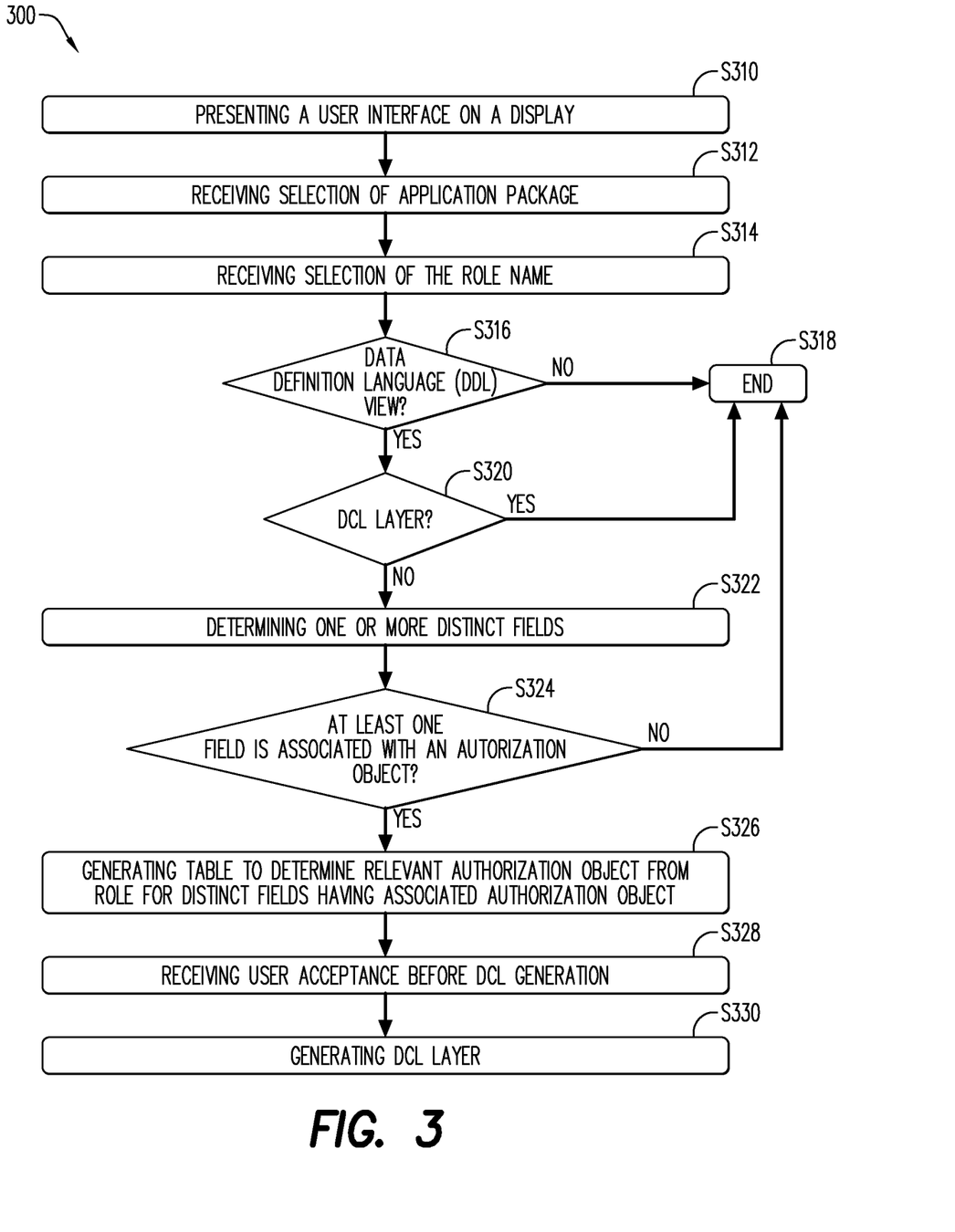
FIG. 3 is a flow diagram of a process according to some embodiments.

Then in S312, the developer 150 selects one or more application packages 135. Selection of the one or more application packages 135 may be by any suitable selection method. For example, the developer 150 may highlight the application package 135 and select an "OK" button (not shown), or double-click on the highlighted application package 135.

Next, in S314, the developer 150 may be presented with a user interface 600 (FIG. 6), and a role name is received. In one or more embodiments, the user interface 600 may include a package name field 602, with the package name 604 provided in the package name field 602. In one or more embodiments, the package name 604 may be pre-filled in the package name field 602, as the developer 150 has already selected the application package in S312. In one or more embodiments, the package name field 604 may be a read-only field. In one or more embodiments, the package name field 604 may receive user-entry of the package name 604.

In one or more embodiments, the user interface 600 may also include a user-entry Role Name field 606 operative to receive a role name 608. The role name 608 may refer to a role (e.g., activity group) of a client, where the role may be based on an organizational plan of an organization. The role name 608 may be associated with an administrative function (e.g., a materials master, a business partner, or any other suitable organizational role). In one or more embodiments, the role name 608 may act as a connection between the client 140 and a corresponding authorization object 206. In one or more embodiments, the role name 608 may be the entity that may access particular data.

Turning back to the process 300, in S314, the role name field 606 receives the role name 608. In one or more embodiments, the developer 150 may enter the role name 608 in the role name field 606, or may receive a suggestion for the role name 608. In one or more embodiments, the role name field 606 may include a drop-down list of selectable roles associated with the application package 135, or may provide other help functionality via selection of a key (e.g., F4) or other help actuator.

After the role name 608 is received in S314, the data protection module 155 may determine in S316 whether the application package includes any DDL views 202. In one or more embodiments, the determination may be based on analysis of a look-up table (not shown), or any other suitable method. If it is determined in S316 that the application package 135 does not include any DDL views 202, the process 300 proceeds to S318 and ends. It is noted that in one or more embodiments, the application package 135 may not have any views.

If it is determined in S316 that the application package 135 does include one or more DDL views 202, the process 300 proceeds to S320, and it is determined, whether a DCL view 204 exists for each of the one or more DDL views 202. The developer may be prompted for relevant authorization objects for the fields exposed through the DDL view. If it is determined in S320 that the application package 135 does include a DCL layer 204, the process proceeds to S318 and ends. The developer may also edit the DCL if they want to provide extra authorization for specific-use cases and not restrict what is considered as optimum authorization.

Figure 5:
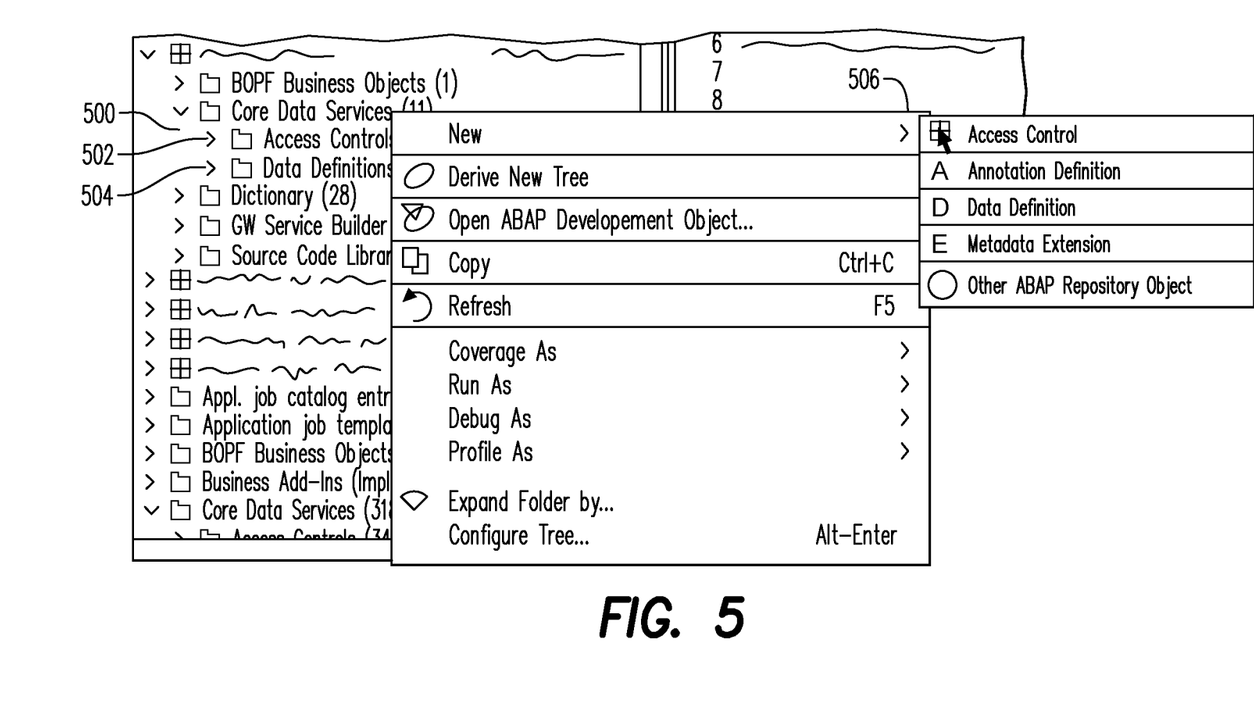
FIG. 5 is an outward view of a graphical interface according to some embodiments.

Turning to FIG. 5, for example, a structure 500 of one of the DDL views 202 is presented on the display 402. In one or more embodiments, the structure 500 may include access controls 502 and data definitions 504. In one or more embodiments, every view 202 may include a data definition 504, including the tables and fields provided in the view 202. In one or more embodiments, every data definition 504 may be associated with an access control 502 to restrict access to the view to certain end users. In one or more embodiments, the access control 502 may include one or more authorization objects 206 that may be used to restrict the access to the definition. In one or more embodiments, the DCL layer generation may begin via user-selection of a "new" "access control," as indicated by 506 in FIG. 5.

Returning to the process 300, if it is determined in S320 that the application package 135 does not include the DCL view 204 for each view 202, the process 300 proceeds to S322.

Figure 9A:
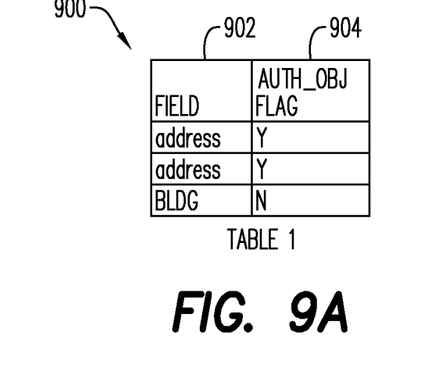
FIGS. 9A-9D are tables according to some embodiments.
Figure 9B:
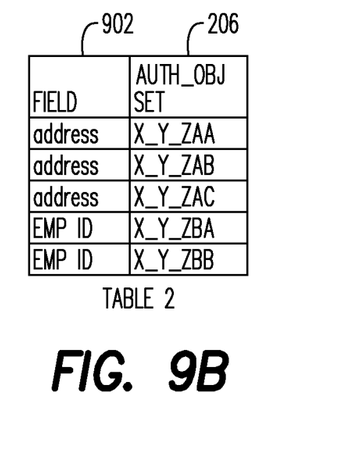
Figure 9C:
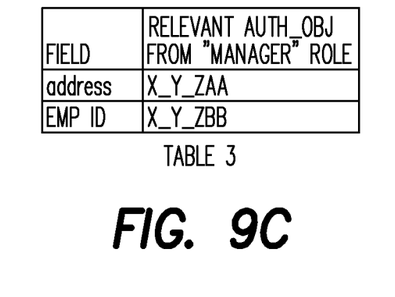
Figure 9D:
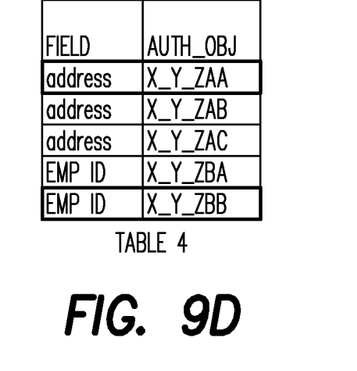

In S322, for all of the views 202 associated with the role 608, one or more distinct fields are determined. In one or more embodiments, the role name 608 may be associated with, and have access to, one or more views 202, and each view may include one or more fields 902 (FIG. 9). The data protection module 155 may determine, in S322, which fields 902 are distinct (e.g., not repeated across the different views associated with the single role name). Then, in S324, for each distinct field it is determined whether the field 902 is associated with an authorization object 206. In one or more embodiments, the determination may be based on analysis of a plurality of tables 900 (FIG. 9) or any other suitable method. In one or more embodiments, during design and development of the application package 135, when the field 902 is created and added to the package 135, the tables 900 may receive an authorization object indicator (e.g., a flag) 904 associated with that field. The authorization object indicator 904 may indicate whether the field 902 is associated with an authorization object 206. When the field 902 is associated with the authorization object 206, access to the field 902 is then qualified for restriction.

Consider, as a non-exhaustive example, the role input provided by the user is "manager." Table 1 in FIG. 9A provides distinct fields 902 on the data definition views. Then, Table 2 in FIG. 9B may be generated in one or more embodiments. Table 2 may include fields 902 only with an auth-obj flag 904 of "y" (yes). Table 2 may be populated from fetching field and its maximum auth_obj set (one or more authorization objects) from all areas. For example, the address field 902 may have three auto_obj related to three areas: customer, warehouse and supplier; and EmpID may have auth_obj related to two areas: supplies and customer. Next, Table 3 in FIG. 9C may be populated by fetching fields and the relevant auth_obj from the "manager" role. Following this step, for DCL generation, Table 2 and Table 3 entries are considered to generate Table 4 (FIG. 9D), where relevant authorization objects from Table 3 are considered. In one or more embodiments, the value for authorization object for a field 902 may be proposed to the user based on Table 3 (for example, address field may be proposed with X_Y_ZAA auth_obj). In one or more embodiments, the user may also be provided with the opportunity to change this proposed auth-obj to any other auth-obj from Table 2. For example, address field may have the option to change to X_Y_ZAB or X_Y_ZAC, even though X-Y_ZAA auth_obj was proposed. In one or more embodiments, the highlighted entries in Table 4 may be those proposed by the data protection module 155 for a field in the DCL.

Figure 11A:
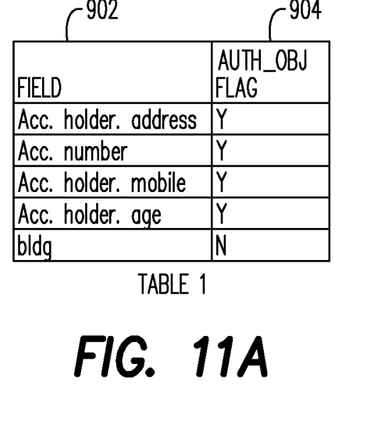
FIG. 11A-11D are tables according to some embodiments.
Figure 11B:
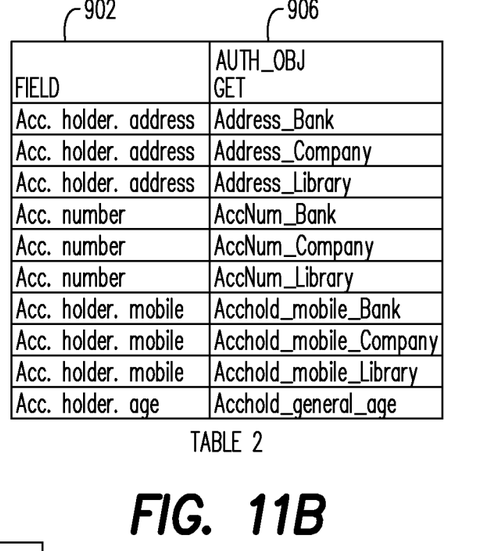
Figure 11C:
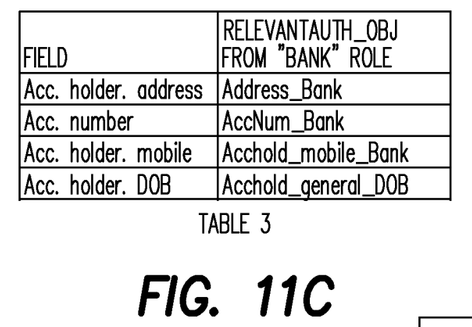
Figure 11D:
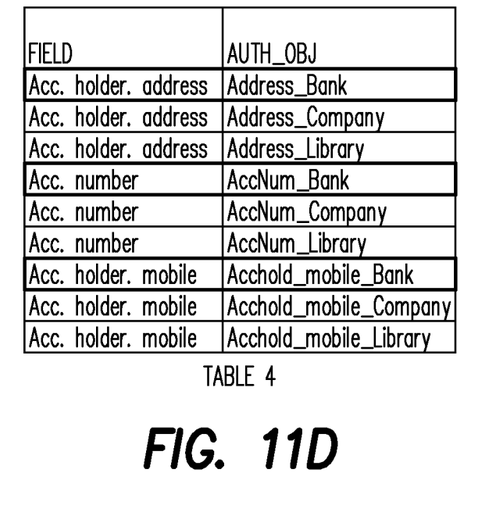

As another non-exhaustive example, consider an instance where a field is present in Table 2 (FIG. 11B) but not in Table 3 (FIG. 11C), and the user has input "Bank" as the role. In this example, the role of "bank" may include sensitive data regarding account holder details, which may be desirable to protect, per Table 1 (FIG. 11A). As above, the relevant auth_obj for fields in the "Bank" may be obtained in Table 3. It is noted that since "Acc.Holders.DOB" is not present in Table 2, it may not be considered for DCL generation. Similarly, "Acc.Holder.Age" is not present in Table 3 and it may not be considered for DCL generation. It may be concluded that auth_obj may be considered for fields present in both Table 2 and Table 3 for DCL generation, by proposing relevant auth_obj from Table 3 and also providing the option to a user to change the auth_obj and a field to any other auth)obj and field from its respective auth_obj set of Table 2 (upon user decision). Table 4 (FIG. 11D) is generated upon fields common in both Table 2 and Table 3. In one or more embodiments, the highlighted entries in Table 4 may be those proposed by the data protection module 155 for a field in the DCL.

Turning back to the process, 300, for each distinct field, when it is determined in S324 that the distinct field 902 is not associated with an authorization object 206, the process 300 proceeds to S318 and the process ends 300 (e.g., there may be no reason to create a DCL layer because the field does not make use of any restrictions).

When it is determined in S324 that the distinct field 902 is associated with an authorization object 206, the process 300 proceeds to S326. In S326, the relevant authorization object 206 for the distinct field 902 is determined based on the role name 608. In one or more embodiments, the determination may be provided via generation of a table or any other suitable process that maps the relevant authorization object to the role name 608. For example, in one or more embodiments, a mapping user interface 700 (FIG. 7) may be provided to the developer 150. The mapping user interface 700 may include data related to the role name 608, fields which should be protected and authorization objects 206 associated with those fields (e.g., the Address field belongs to Business partner area). In one or more embodiments, the mapping user interface 700 may include one or more distinct fields 702 with relevant authorization objects 206 for the role name 608 selected in S314. In one or more embodiments, each distinct field 702 may be associated with one or more authorization objects 206. For example, if the distinct field 702 is "Address," there may be different authorization objects associated with that field for different addresses (e.g., one for a material address, one for a warehouse address, one for a supplier's address). The developer 150 then selects one or more authorization objects 206 to associate with the distinct field 702. In one or more embodiments, the authorization objects are suggested to the developer 150 via the mapping user interface 700. In one or more embodiments, the developer 150 may enter an authorization object to associate with the distinct field that was not suggested to the developer 150. For example, in one or more embodiments, there may be a free-form text entry field for the developer 150 to manually enter the authorization object 206. In one or more embodiments, the developer 150 may select authorization objects 206 for any of the distinct fields 702 presented on the mapping user interface 700. When the developer 150 is finished with the mapping, the developer 150 may select an "OK" indicator 704 or other suitable indicator.

Figure 10:
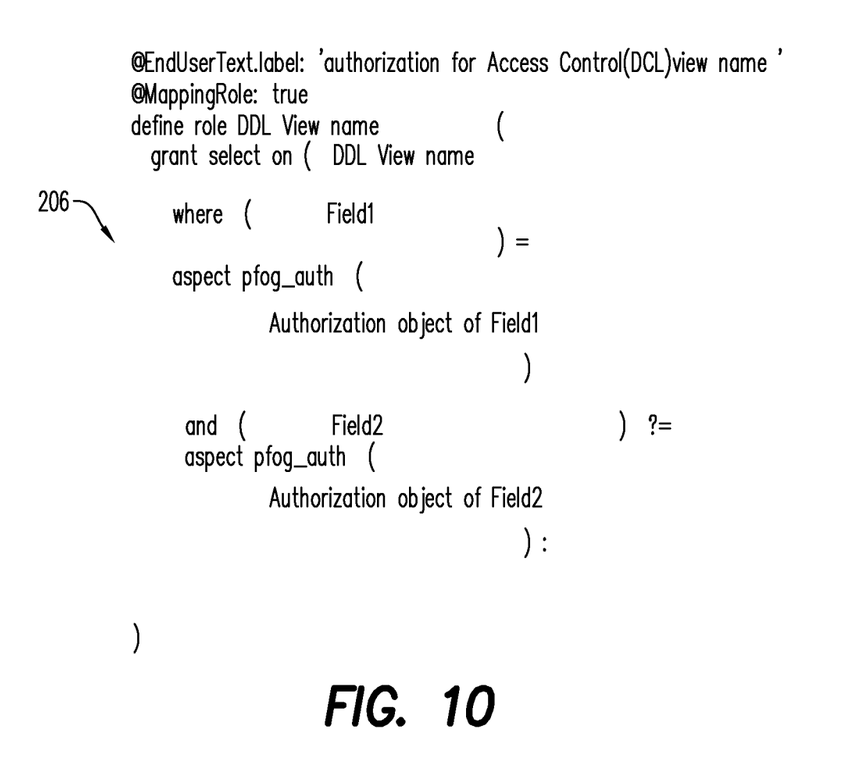
FIG. 10 is an outward view of a graphical interface according to some embodiments

After the relevant authorization object is determined for distinct fields in S326, a user acceptance (e.g., developer or client) of the DCL layer generation may be received in S328. Then, the DCL layer 206 is generated in S330 for these fields for all of the views 202 in the application package 135. A non-exhaustive example of a DCL layer 206 is shown in FIG. 10.

After the DCL layer 206 is generated for each view 202, when the client 140 runs a query, the query will return to the client the data authorized by the DCL layer 206 via the view 202.

In one or more embodiments, the client 140 may easily change the authorization objects associated with the role 608 via the mapping user interface 700, using the same process as above. In one or more embodiments, the client 140 may also edit the DCL views separately.

Figure 8:
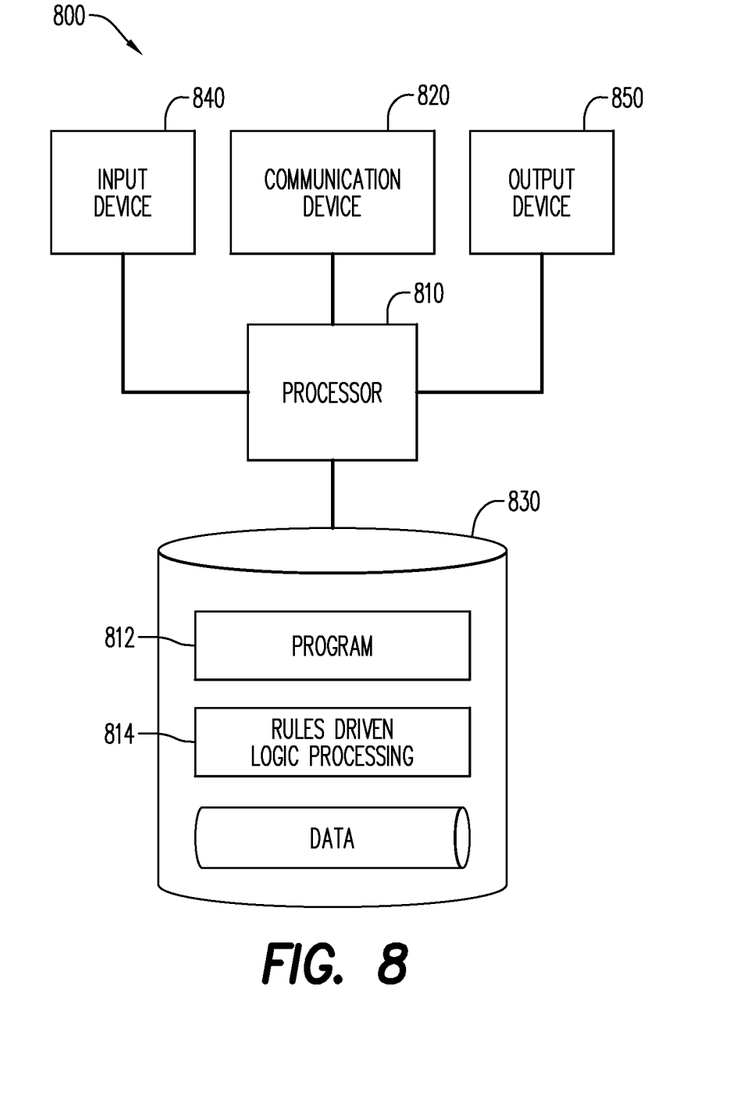
FIG. 8 is a block diagram of a system according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 100. Apparatus 800 may include other unshown elements according to some embodiments.

Apparatus 800 includes data protection processor 810 operatively coupled to communication device 820, data storage device 830, one or more input devices 840, one or more output devices 850 and memory 860. Communication device 820 may facilitate communication with external devices, such as application server 130. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device/memory 830 may comprise any device, including combinations of magnetic storage devices (e.g., magnetic tape, hard disk drives and flash memory), optical storage devices, Read Only Memory (ROM) devices, Random Access Memory (RAM) etc.

The storage device 830 stores a program 812 and/or re-usable action platform logic 814 for controlling the processor 810. The processor 810 performs instructions of the programs 812, 814, and thereby operates in accordance with any of the embodiments described herein, including but not limited to process 300.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a data protection module;
a display; and
a data protection processor in communication with the data protection module and operative to execute processor-executable process steps to cause the system to:
  present a user interface on a display, the user interface including one or more application packages;
  receive selection of one of the one or more application packages;
  present on the display a user-entry field to receive an end-user-role associated with an administrative function, wherein the end-user-role is linked to at least one authorization object and the authorization object is authorized to access multiple Core Data Service (CDS) views, wherein the CDS view is a data modeling infrastructure and includes Data Definition Language (DDL), a data control layer (DCL), an annotation definition, and a metadata extension;
  receive an input in the user-entry field, wherein the input is one of the end-user-role and a request for assistance, wherein the authorization object is linked to multiple CDS views for the received input of the end-user-role;
  determine whether the selected application package includes at least one core data service (CDS) view;
  determine whether a data control language (DCL) layer is provided for each included CDS view;
  automatically generate the DCL layer for each included CDS view if the DCL layer is not provided for the included CDS view; and
  transmit the DCL layer with the CDS view in response to execution of a query.

2. The system of claim 1, wherein the DCL layer restricts access to the at least one CDS view.

3. The system of claim 2, wherein the DCL layer includes one or more authorization objects.

4. The system of claim 3, wherein each of the one or more authorization objects is associated with a role allowed to access the CDS view.

5. The system of claim 1, wherein the CDS view includes less than all of data available in a database table.

6. The system of claim 1, further comprising processor-executable process steps to cause the system to:
determine a number of distinct fields.

7. The system of claim 6, further comprising processor-executable process steps to cause the system to:
for each distinct field, determine whether the field is associated with at least one authorization object; and
if the distinct field is associated with the authorization object, determine the distinct field is qualified to be included in the DCL layer.

8. The system of claim 7, further comprising processor-executable process steps to cause the system to:
present on the display the one or more authorization objects for mapping to each distinct field;
receive a selection of the one or more authorization objects; and
generate the DCL layer.

9. A computer-implemented method comprising:
presenting a user interface on a display, the user interface including one or more application component packages;
receiving selection of one of the one or more application packages;
determining whether the selected application package includes at least one core data service (CDS) view;
determining whether a data control language (DCL) layer is provided for each included CDS view;
if the DCL layer is not provided for the included CDS view, presenting on the display a user-entry field to receive an end-user-role associated with an administrative function, wherein the end-user-role is linked to at least one authorization object and the authorization object is authorized to access multiple Core Data Service (CDS) views, wherein the CDS view is a data modeling infrastructure and includes Data Definition Language (DDL), a data control language layer (DCL), an annotation definition, and a metadata extension;
receiving an input in the user-entry field, wherein the input is one of the end-user-role and a request for assistance, wherein the authorization object is linked to multiple CDS views for the received input of the end-user-role;
automatically generating the DCL layer for each included CDS view that does not have a provided DCL layer, based on the received input; and
transmitting the DCL layer with the CDS view in response to execution of a query.

10. The method of claim 9, wherein automatically generating the DCL layer further comprises:
determining whether any of the fields in the included CDS views are distinct fields;
determining, for each distinct field, whether the field is associated with at least one authorization object; and
determining the distinct field is qualified to be included in the DCL layer if the distinct field is associated with the authorization object.

11. The method of claim 10, further comprising:
presenting on the display the one or more authorization objects for mapping to each distinct field; and
receiving a selection of the one or more authorization objects.

12. The method of claim 9 wherein the DCL layer restricts access to the at least one CDS view.

13. The method of claim 9, wherein the CDS view includes less than all of data available in a database table.

14. A non-transitory computer-readable medium storing program code, the program code executable by a computer system to cause the computer system to:
present a user interface on a display, the user interface including one or more application packages;
receive selection of one of the one or more application packages;
determine whether the selected application package includes at least one core data service (CDS) view;
determine whether a data control language (DCL) layer is provided for each included CDS view;
if the DCL layer is not provided for the included CDS view, present on the display a user-entry field to receive an end-user-role associated with an administrative function, wherein the end-user-role is linked to at least one authorization object and the authorization object is authorized to access multiple Core Data Service (CDS) views, wherein the CDS view is a data modeling infrastructure and includes Data Definition Language (DDL), a data control language layer (DCL), an annotation definition, and a metadata extension;
receive an input in the user-entry field, wherein the input is one of the end-user-role and a request for assistance, wherein the authorization object is linked to multiple CDS views for the received input of the end-user-role;

automatically generate the DCL layer for each included CDS view if the DCL layer is not provided for the included CDS view; and transmit the DCL layer with the CDS view in response to execution of a query.

15. The medium of claim 14 wherein to automatically generate the DCL layer, the program code is further executable by the computer system to:

determine whether any of the fields in the included CDS views are distinct fields;

determine, for each distinct field, whether the field is associated with at least one authorization object; and determine the distinct field is qualified to be included in the DCL layer if the distinct field is associated with the authorization object.

16. The medium of claim 15, wherein the program code is further executable by the computer system to:

present on the display the one or more authorization objects for mapping to each distinct field;

receive a selection of the one or more authorization objects; and generate the DCL layer.

17. The medium of claim 16, wherein the DCL layer restricts access to the at least one CDS view.

* * * * *